W. O. LANE.
WIRE GRIP.
APPLICATION FILED JAN. 7, 1914.
1,124,034.
Patented Jan. 5, 1915.
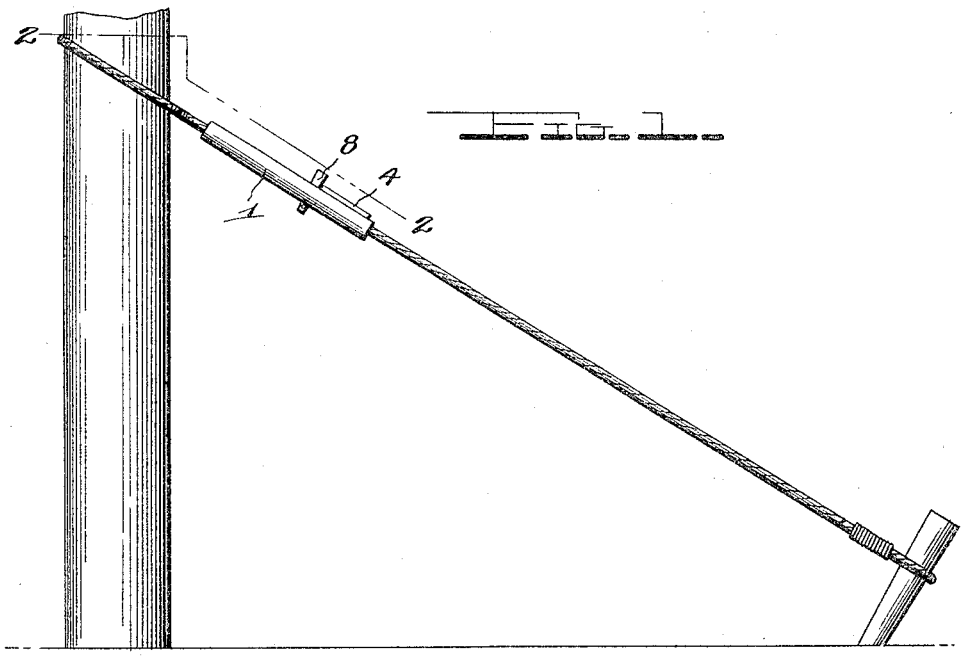
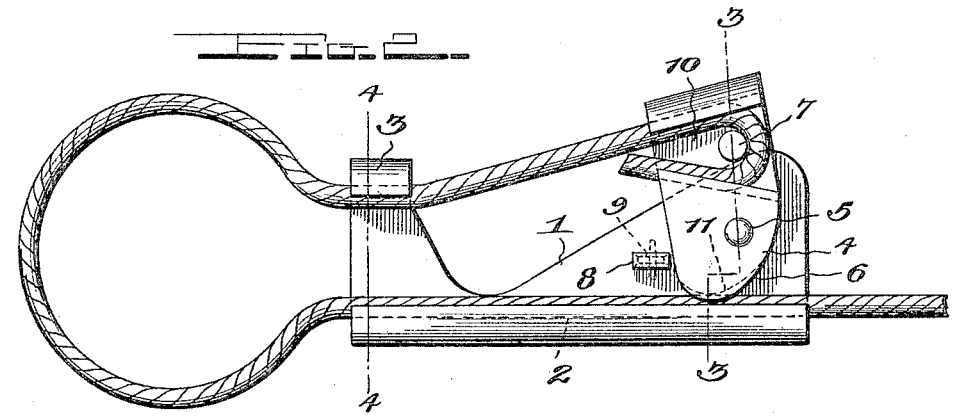
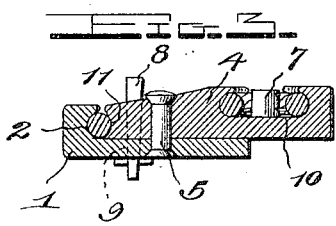
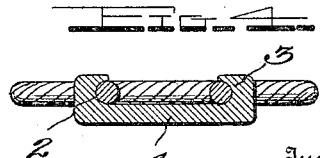
Witnesses
Lester L. Sargent
Edward A. Conroy
Inventor
William Ord Lane,
By Jerry A. Mathew,
Attorney

UNITED STATES PATENT OFFICE.

WILLIAM ORD LANE, OF CLEVELAND, OHIO.

WIRE-GRIP.

1,124,034.      Specification of Letters Patent.      Patented Jan. 5, 1915.

Application filed January 7, 1914. Serial No. 810,706.

*To all whom it may concern:*

Be it known that I, WILLIAM ORD LANE, a citizen of the United States, residing at Cleveland, in the county of Cuyahoga and State of Ohio, have invented a new and useful Wire-Grip, of which the following is a specification.

The object of my invention is to provide an improved wire grip to be used for clamping wire guys or supports for telegraph, telephone, electric light, trolley or other poles; and to provide a simple and more effective clamping device, which can be easily used to fasten the wire guy securely and quickly.

Referring to the accompanying drawings, which illustrate my invention—Figure 1 is a side elevation showing the application of my device; Fig. 2 is a plan view on line 2—2 of Fig. 1; Fig. 3 is a cross section on line 3—3 of Fig. 2; Fig. 4 is a cross section on line 4—4 of Fig. 2.

I provide a clamping plate 1 having a grooved flange 2 extending longitudinally of the plate, and having an opposite flanged finger 3 at one end of the plate. In combination with clamping plate 1, I mount a clutch 4, by means of pivot 5 projecting from the clutch, which pivot 5 is also riveted to the main body of the clamping plate allowing the clutch to work on a pivot and act as a clamp. Clutch 4 has a substantially V-shaped slotted portion 10 having grooved sides to engage a looped end of the wire guy. The loop is secured by a pin 7 projecting upward from the base of the slotted portion of the clutch, as illustrated in the accompanying drawings (Figs. 2 and 3). A pin 8, insertible through orifice 9 in the body of the clamping plate, serves as a locking member for the clutch. Clutch 4 has a cam base 6 which has a grooved edge 11 engaging with and fastening the wire in flange 2.

In operation, the end of a guy wire is passed around the post, at the desired portion. The end of guy wire is then bent into a loop which is placed in the substantially V-shaped slotted portion 10 of clutch 11, with the loop passing around pin 7. The wire is then engaged by flanged finger 3; and flange 2 of the wire grip is engaged with the taut wire. The grooved edge 11 of cam base 6 of clutch 4 locks the wire against flange 2. Pin 8 is inserted through orifice 9 in the body of the clamp to prevent the clutch from being knocked loose while in service. Pin 8 is of wedge-shape so that it may be forced firmly into place.

What I claim is:

A wire grip consisting of a clamping plate having a longitudinal wire-engaging flange, and a wire-engaging finger at one end of the clamping plate, in combination with a clutch pivotally mounted on the body of the clamping plate and having a substantially V-shaped slotted portion and a projecting pin therein spaced substantially apart from the smaller end and from the sides thereof for engaging a wire loop, the aforesaid clutch also having a cam base positioned to lock wire or wire cable against the longitudinal wire-engaging flange of the clamping plate.

In witness whereof I hereunto attach my signature, in the presence of two witnesses.

WILLIAM ORD LANE.

Witnesses:
CHAS. ROTH,
GEORGE J. MILLER.

Copies of this patent may be obtained for five cents each, by addressing the "Commissioner of Patents, Washington, D. C."